United States Patent [19]

Sugino et al.

[11] Patent Number: 5,704,738
[45] Date of Patent: Jan. 6, 1998

[54] TOOL ATTACHMENT ASSEMBLY

[76] Inventors: Shigeru Sugino; Kazuyuki Ishikawa, both of c/o Sugino Corp., 1700 N. Penny La., Schaumburg, Ill. 60173

[21] Appl. No.: 649,479

[22] Filed: May 17, 1996

[51] Int. Cl.[6] ............................ B23F 5/14; B23F 1/16
[52] U.S. Cl. ..................... 408/1 R; 279/16; 279/103; 408/239 R; 470/97
[58] Field of Search ................ 279/16, 103; 408/238, 408/239 R, 239 A, 240, 22, 1 R; 470/96, 97; 409/234

[56] References Cited

U.S. PATENT DOCUMENTS

| 2,429,564 | 10/1947 | Petersen . | |
|---|---|---|---|
| 2,793,867 | 5/1957 | Stuart | 279/16 |
| 3,174,168 | 3/1965 | Jones . | |
| 3,178,739 | 4/1965 | Plummer et al. . | |
| 3,334,366 | 8/1967 | Schrolucke | 470/96 |
| 3,466,681 | 9/1969 | Benjamin et al. . | |
| 3,579,688 | 5/1971 | Keltz et al. . | |
| 3,595,591 | 7/1971 | Koch . | |
| 3,630,630 | 12/1971 | Nyman . | |
| 3,717,892 | 2/1973 | Johnson . | |
| 3,740,063 | 6/1973 | Smith . | |
| 3,778,071 | 12/1973 | Buck . | |
| 3,787,136 | 1/1974 | Steiner . | |
| 3,945,751 | 3/1976 | Johnson . | |
| 3,970,406 | 7/1976 | Kubicek . | |
| 3,999,642 | 12/1976 | Johnson . | |
| 4,014,421 | 3/1977 | Johnson . | |
| 4,021,132 | 5/1977 | Benjamin et al. . | |
| 4,028,763 | 6/1977 | Jenner . | |
| 4,050,842 | 9/1977 | Janin . | |
| 4,111,442 | 9/1978 | Wawrzyniak . | |
| 4,174,918 | 11/1979 | Tanaka . | |
| 4,269,421 | 5/1981 | Wawrzyniak . | |
| 4,298,208 | 11/1981 | Benjamin et al. | 409/234 |
| 4,364,694 | 12/1982 | Miles . | |
| 4,439,075 | 3/1984 | Wiederkehr . | |
| 4,457,153 | 7/1984 | Russell . | |
| 4,514,115 | 4/1985 | Akashi . | |
| 4,531,865 | 7/1985 | Johnson . | |
| 4,547,101 | 10/1985 | Dowdakin, Sr. . | |
| 4,556,348 | 12/1985 | Liou . | |
| 4,669,930 | 6/1987 | Stenmark . | |
| 4,705,437 | 11/1987 | Johnson . | |
| 4,710,079 | 12/1987 | Smith et al. . | |
| 4,810,138 | 3/1989 | Obara . | |
| 4,818,158 | 4/1989 | Munroe . | |
| 4,834,596 | 5/1989 | Hollifield et al. . | |
| 5,032,043 | 7/1991 | Hollifield . | |
| 5,271,697 | 12/1993 | Johnson et al. . | |
| 5,277,526 | 1/1994 | Corsi . | |
| 5,372,465 | 12/1994 | Smith . | |

*Primary Examiner*—Steven C. Bishop
*Attorney, Agent, or Firm*—Wood, Phillips, VanSanten, Clark & Mortimer

[57] ABSTRACT

A tool attachment assembly having a housing with a central axis, a toolholder with a tool carrying portion and a mounting portion spaced axially from the tool carrying portion, a projection on one of the housing and mounting portion of the tool holder, and a receptacle on the other of the housing and mounting portion of the tool holder for receiving the projection so that the housing and the tool holder reside at least partially, one within the other, with the tool holder in an operative state on the housing. There are axially facing first and second surfaces, one each on the housing and the mounting portion of the tool holder, that extend at least partially around the central axis and are abuttable to each other to limit movement of the tool holder axially towards the housing with the tool holder in the operative state. At least one of the first and second surfaces is other than parallel to a plane that is orthogonal to the central axis.

22 Claims, 3 Drawing Sheets

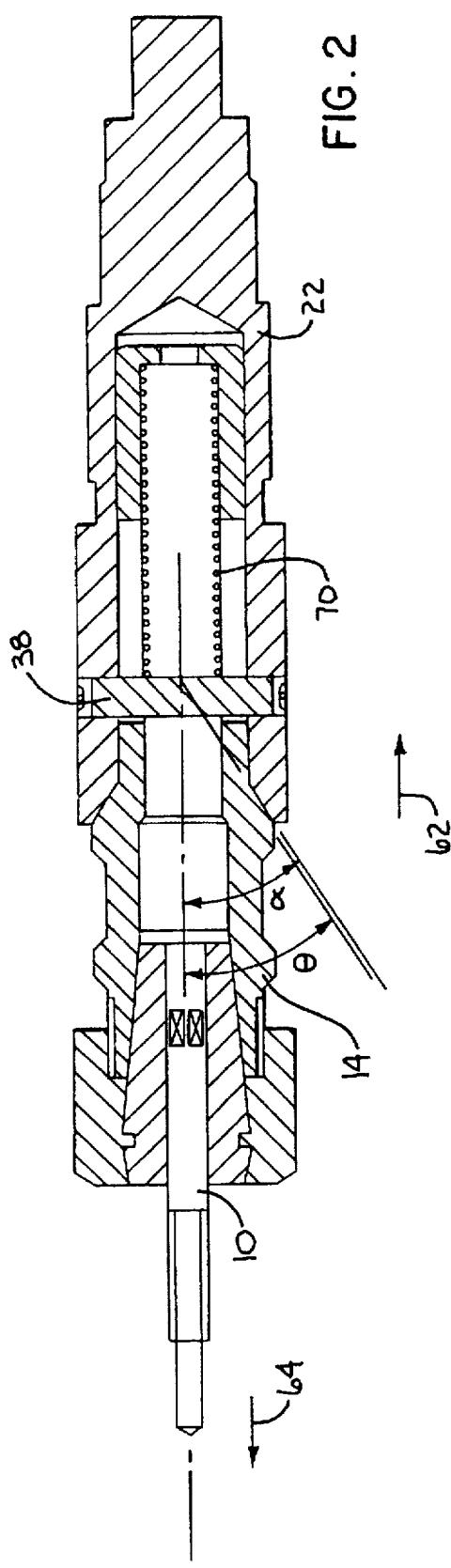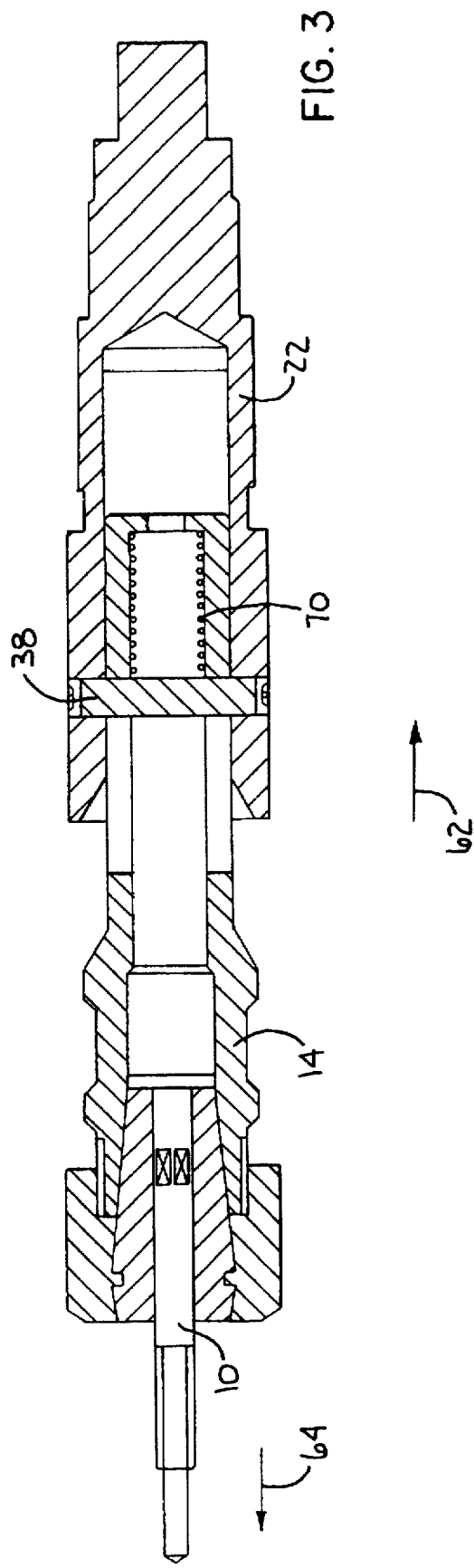

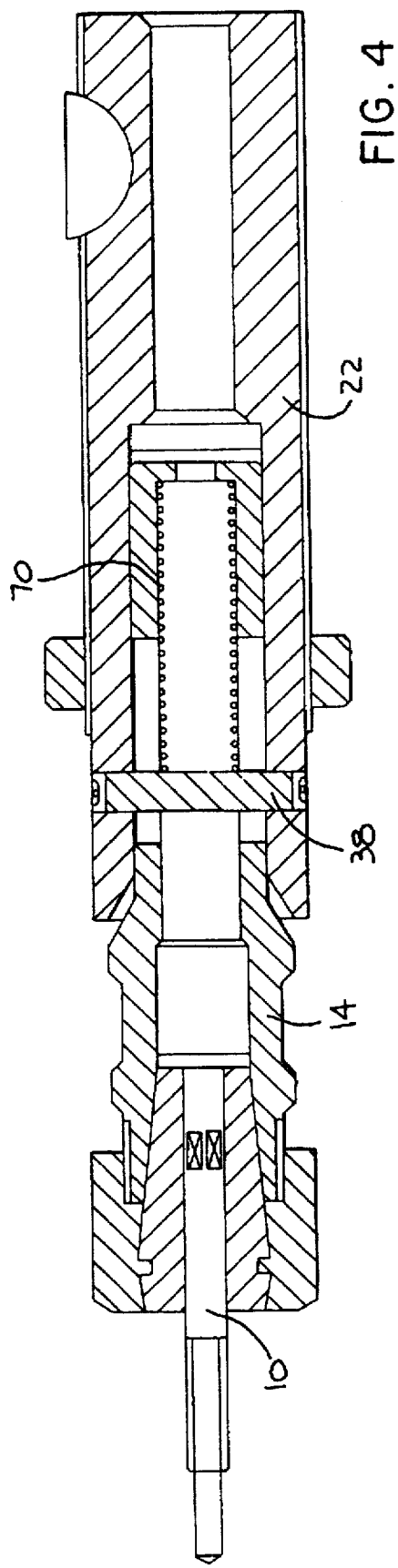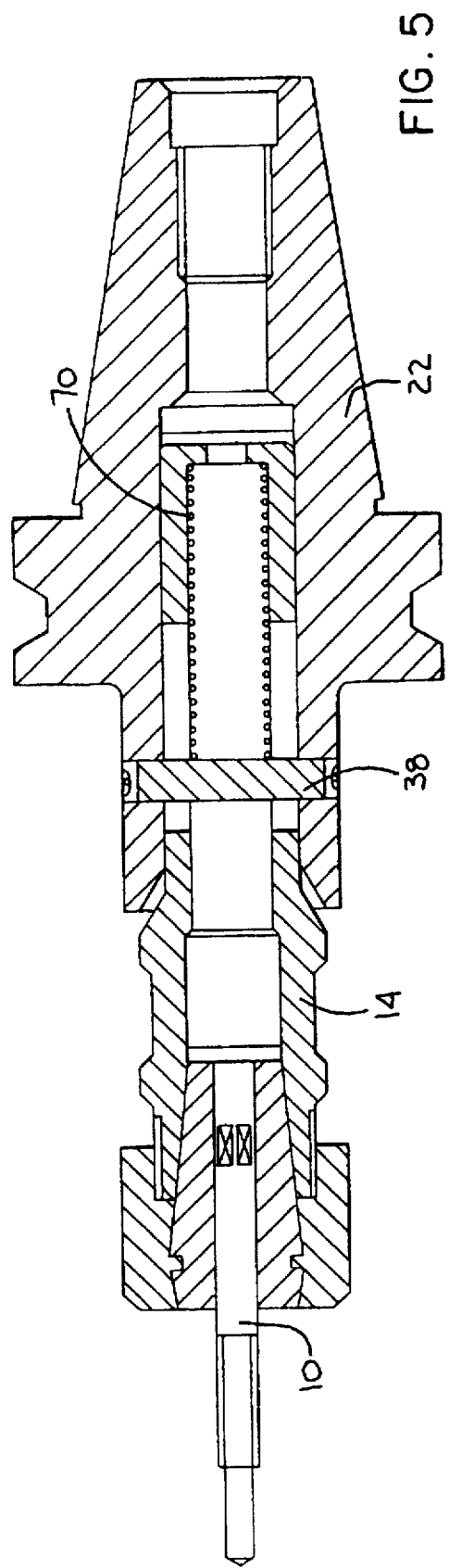

TOOL ATTACHMENT ASSEMBLY

FIELD OF THE INVENTION

This invention is directed to a tool attachment assembly having a housing and a tool holder, each with a central axis, wherein the tool holder is guided axially relative to the housing between first and second positions and allowed to move radially relative to the housing in one of the first and second positions.

BACKGROUND OF THE INVENTION

A threaded bore is commonly formed using a two-step process. First, a bore is formed using a process such as drilling, wherein a drill bit is applied to a workpiece and driven about its central axis to remove material from the workpiece at the desired location of the bore. Second, threads are formed in the bore using a process such as tapping, wherein a tapping tool is passed into the bore and driven about its central axis to remove additional material and form teeth, preferably with the central axis of the tapping tool aligned with the path of the central axis of the drill.

Each of these two machining processes, drilling and tapping, requires a tool attachment assembly with widely differing performance characteristics. For example, the drilling process requires the tool attachment assembly to fixedly hold the drill so as to minimize the uncontrolled movement of the drill relative to the tool attachment assembly. The translation of a central axis of the drill (and thus a central axis of the bore as formed) relative to a central axis for the bore as planned is highly undesirable. If the distance between the central axis of the bore as formed and the central axis of the bore as planned is large enough with respect to the tolerances involved, the workpiece may have to be scrapped. Even if the distance between the central axis of the bore as formed and the central axis of the bore as planned is within desired tolerances, relatively slight differences between the bore as planned and the bore as formed will require that the tapping process used to form the threads in the bore be capable of translating a central axis of the tapping tool relative to the central axis of the bore as planned so as to prevent damage or even destruction of the tapping tool. Thus, to avoid these undesirable results, a preferred drill attachment assembly will hold the drill bit substantially fixed.

By contrast, a preferred tapping tool attachment assembly will allow the tapping tool to move, or float, relatively freely radially relative to, as well as axially along, the central axis of the tool attachment assembly. Radial movement, or float, may be characterized as translational movement of the central axis of the tool radially relative to the central axis of the tool attachment assembly. Radial movement is desirable to prevent damage to the tapping tool when the process used to form the bore does not exactly align the central axis of the bore as formed with the central axis of the bore as planned. Consequently, radial float also allows for greater tolerances to be used with respect to the placement of the bore, if desirable and permissible with respect to the tolerances for the workpiece as a whole. Various examples of designs incorporating radial float are disclosed in U.S. Pat. Nos. 4,111,442; 4,439,075; and 4,547,101.

Axial float is also desirable in a tapping tool attachment assembly. In operation, for a fixed rotational speed of the tapping tool about its central axis, the feed rate of the tapping tool into the workpiece is commonly greater than the feed rate of the tool holding assembly. To accommodate the differences in feed rate, special (and relatively expensive) equipment can be purchased to synchronize the feed rate of the tool assembly and the rotational speed of the tapping tool to prevent separation of the tool from the tool attachment assembly, or damage to the tapping tool. Alternatively, the tool holding assembly can be designed to allow the tapping tool to revolve at a fixed rotational speed and to move axially at its own feed rate relative to the tool attachment assembly. Various designs incorporating such a form of axial float can be found in U.S. Pat. Nos. 4,364,694 and 4,514,115.

Given that the drill attachment assembly preferably maintains the tool in a substantially fixed position relative to the tool holding assembly, and the tapping tool attachment assembly preferably allows the tool to move substantially freely relative to the tool holding assembly, these two machining processes are commonly performed using two different tool attachment assemblies. Thus, as a further consequence, the two-step process of making a threaded bore is commonly carried out by changing the tool attachment assembly after drilling and before tapping, or by performing the drilling on one machine and the tapping on another.

Either way, whether by changing tool attachment assemblies or by using two different machines, the costs of production are increased and productivity is decreased. For example, if the tool attachment assembly is changed between processes, time will be lost detaching the drill attachment assembly, attaching the tapping tool attachment assembly, and then centering the tapping tool such that the central axis of the tapping tool is substantially aligned with the central axis of the bore as planned. If two different machines are used, then time will be lost transporting the workpiece from one machine to the second, and then centering the workpiece such that the central axis of the tapping tool is substantially aligned with the central axis of the bore as planned. Even if a machining center is used in place of more conventional free-standing vertical or horizontal spindle machines, there will still be time lost changing tools. As the time lost increases, and the chances of misalignment and forming error increase, the costs of production will increase and/or the level of productivity may decrease.

SUMMARY OF THE INVENTION

In one form of the invention, a tool attachment assembly is provided having a housing with a central axis, a toolholder with a tool carrying portion and a mounting portion spaced axially from the tool carrying portion, a projection on one of the housing and mounting portion of the tool holder, and a receptacle on the other of the housing and mounting portion of the tool holder for receiving the projection so that the housing and the tool holder reside at least partially, one within the other, with the tool holder in an operative state on the housing. There are axially facing first and second surfaces, one each on the housing and the mounting portion of the tool holder, that extend at least partially around the central axis and are abuttable to each other to limit movement of the tool holder axially towards the housing with the tool holder in the operative state. At least one of the first and second surfaces is other than parallel to a plane that is orthogonal to the central axis.

The first and second surfaces may extend fully around the central axis.

One or both of the first and second surfaces may be planar, as viewed in cross section.

In one form, the first surface is at a first angle to the central axis, with the second surface at a second angle to the central axis, with the second angle being appropriately equal to the first angle.

The projection and receptacle are relatively dimensioned so that the tool holder and housing are movable in a radial direction relative to each other with the tool holder and housing in one relative axial position, as described below. In one form, the projection has an annular outer surface and the receptacle an annular inner surface which, with the projection centered in the receptacle, are spaced from each other radially a distance between 0.00027 and 0.0016 inches.

In one form, the first and second surfaces are abuttable to each other to limit radial movement of the tool holder relative to the housing with the tool holder in the operative state and in a first axial position relative to the housing. The first and second surfaces may be shaped to cause the tool holder to consistently align radially relative to each other as the tool holder is moved from a second axial position relative to the housing, wherein the first and second surfaces do not abut, into the first position. The tool holder and housing may align with their axes substantially coincident. The surfaces may cause the tool holder to be substantially fixed radially relative to the housing as the tool holder moves from the second position into the first position.

The tool holder may be limited in axial movement away from the housing. In one form, this is accomplished by providing a pin on one of the tool holder and housing and an elongate slot in the other of the tool holder and housing for receiving the pin. The elongate slot is bounded by a surface that abuts to the pin.

The tool holder may normally be biased towards the housing. This may be accomplished by a spring element.

In one form, the tool holder has a second receptacle bounded by an axially facing surface and the spring resides at least partially in the second receptacle and is compressed between the pin and the axially facing surface bounding the second receptacle.

The tool assembly may be provided in combination with a tool having a rotational axis, a first drill portion, and a second tapping portion spaced axially relative to the first drill portion. The tool is maintained in an operative position on the tool holder. The tool holder is in the first axial position relative to the housing with the first and second surfaces abutted to each other and the second axial position relative to the housing with the tool holder moved axially away from the housing so that the first and second surfaces do not abut to each other. The housing and tool holder are relatively dimensioned to allow the tool holder to move radially relative to each other with the tool holder in the second position.

In another form of the invention, a tool attachment assembly is provided having a housing and tool holder, each with a central axis, with there being structure cooperating between the housing and tool holder for maintaining the tool holder in an operative state on the housing and for guiding movement of the tool holder axially relative to the housing between a) a first position, wherein relative radial movement between the housing and tool holder is substantially prevented and b) a second position, wherein the tool holder can float radially relative to the housing.

The invention is also directed to a method of forming a threaded bore, which method includes the steps of providing a tool attachment assembly having a housing with a first central axis, a rotary tool on the tool holder and having a drill portion and a tapping portion, and structure cooperating between the housing and tool holder for maintaining the tool holder in an operative state on the housing and for guiding movement of the tool holder axially relative to the housing between a) a first position wherein radial movement between the housing and the tool holder is substantially prevented and b) a second position wherein the tool holder can float radially relative to the housing. The method further includes the step of rotating the tool holder at a first speed while advancing the housing in a first direction at a first rate to cause the drill portion to produce a bore in the workpiece and thereafter advancing the tapping portion into the workpiece bore with the tool holder rotating at the first speed and advancing in the first direction at the first rate so that the tapping portion engages the workpiece and as a result advances in the first direction at a rate greater than the first rate to thereby move the tool holder into the second position in which it can float. The tool can then be withdrawn from the workpiece.

BRIEF DESCRIPTION OF THE DRAWINGS

FIG. 2 is a view as in FIG. 1 with the tool attachment assembly separated from the drilling head;

FIG. 3 is a view as in FIG. 2 with the tool holder in its extrememost extended position relative to the housing;

FIG. 4 is a cross-sectional view of another embodiment of the present invention configured to be used with a conventional drilling machine; and FIG. 5 is a cross-sectional view of a further embodiment of the present invention configured to be used with a machining center with an automatic tool changer.

DESCRIPTION OF THE PREFERRED EMBODIMENTS

Figure 1:
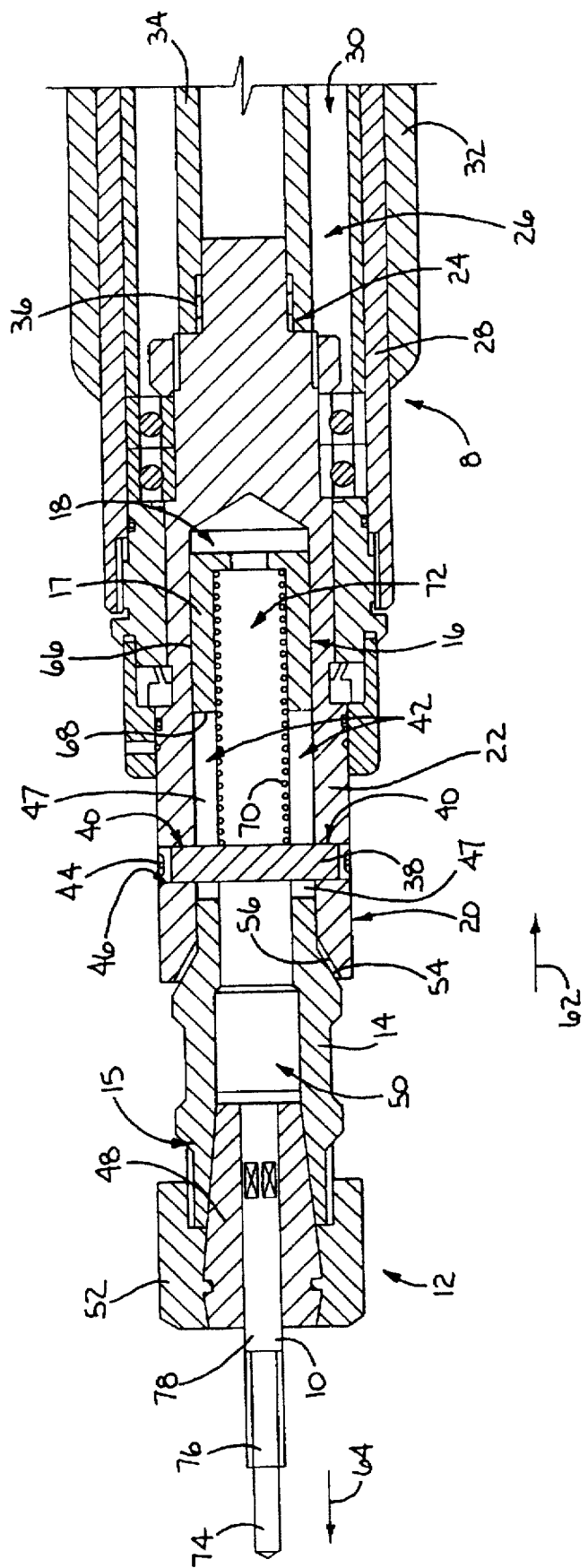
FIG. 1 is a partial cross-sectional view of one embodiment of a tool attachment assembly, including a cooperating tool holder and housing, according to the present invention, with the tool holder in a first position relative to the housing and with the tool attachment assembly operatively connected to an automated drilling head.

A preferred embodiment of the present invention is configured to be used with an automated drilling head 8, for example, the electric drilling head described in U.S. Pat. No. 4,902, 176, incorporated herein by reference. This drilling head 8 is partially shown in FIG. 1. According to the invention, a tool 10 is secured in an operative position at a first end 12 of a floating tool holder 14. The tool holder 14 has a tool carrying portion 15 at its leading end and a mounting portion at its other end 16. A projection 17 on the tool holder 14 is disposed within a receptacle 18 at a first end 20 of a housing 22 with the tool holder 14 in an operative state on the housing 22. In turn, a second end 24 of the tool holder housing 22 is disposed within a receptacle 26 of a ram 28 on the drilling head 8. The ram 28 is disposed within a receptacle 30 in a body 32 on the drilling head 8. Alternatively, the projection 17 may be on the housing 22 and the receptacle 18 on the tool holder 14, as known to those of ordinary skill in the art.

In operation, the tool holder housing 22 is driven by the drilling head 8 via a drive sleeve 34, attached at the second end 24 of the tool holder housing 22 by means of threads 36. As the sleeve 34 rotates, the rotational motion is transmitted to the tool holder housing 22 via the threads 36.

The rotational motion of the tool holder housing 22 is transmitted to the floating tool holder 14 via a drive pin 38. The drive pin 38 passes through a pair of diametrically opposite bores 40 in the tool holder housing 22 and a pair of elongate slots 42 in the floating tool holder 14. The drive pin 38 is secured at both ends to the tool holder housing 22 by means of a retaining ring 44 seated in a groove 46 in the exterior surface of the tool holder housing 22. While the drive pin 38 transmits the rotational motion of the tool housing 22 to the floating tool holder 14 via interaction with the sides 47 of the elongate slots 42, the floating tool holder 14 is free to extend and retract axially along its central axis relative to the holder housing 22 because the elongate slots 42 are preferably longer in the axial direction than the drive pin 38 is wide.

To secure the tool 10 to the tool holder 14, a collet 48 is disposed within a receptacle 50 at the first end 12 of the floating tool holder 14, and the tool 10 is disposed within the collet 48. The collet 48 is releasably held in the receptacle 50 using a collet nut 52 secured to the first end 12 of the floating tool holder 14 by means of threads. Using the collet 48, a number of different tools, such as drills and tapping tools, can be removably secured to the floating tool holder 14.

In performing a drilling operation with the embodiment of the present invention shown in FIGS. 1 and 2, the central axis of the tool 10 is held substantially fixed relative to the central axis of the tool holder 14. Preferably, the tool holder 14 has a surface 54 which abuts against a surface 56 at the first end 20 of the tool holder housing 22. As shown in FIG. 2, the surface 54 is preferably beveled at an angle θ to the central axis of the tool holder 14, and the surface 56 is preferably beveled at a mating angle α, such that the angle θ and the angle α are approximately equal. Preferably, the surfaces 54, 56 are flat, as viewed in cross section. Most preferably, an included angle which is twice the angle θ ranges from 59 degrees, 59 minutes to 60 degrees, while a second included angle which is twice the angle α ranges from 60 degrees to 60 degrees, 1 minute. Alternatively, the surfaces :54, 56 may be manufactured using other shapes, for example, complementary curved surfaces or any other cooperating arrangement that prevents radial shift with the surfaces 54, 56 engaged.

The interaction of the surfaces 54, 56 limits movement of the tool holder 14 towards the housing 22 in a first direction, shown by an arrow 62, opposite a feed direction of the tool holder housing 22, as shown by an arrow 64. The interaction of the surfaces 54, 56 also serves to center the tool 10 within the recess 50 of the floating tool holder 14, so as to preferably maintain a common central axis for the tool 10, the tool holder 14 and the automated drilling head 8.

In performing a tapping operation, the tool 10 attached to the floating tool holder 14 is allowed to move, or float, both radially relative to the central axis of the tool holder housing 22, with the surfaces 54, 56 in non-abutting relationship as shown in FIG. 3, and axially along the central axis of the tool holder housing 22 and lines parallel to the central axis. Preferably, a slight radial spacing 66 exists between the outer annular surface of the tool holder 14 and the inner annular surface of the tool holder housing 22 to allow for translational motion of the tool 10 secured to the tool holder 14 radially relative to the central axis of the tool holder housing 22. Most preferably, the radial spacing 66 is between 0.00027 and 0.0016 inches.

Additionally, the tool holder 14 is allowed to move axially relative to the housing 22 in the feed direction of the tool 10, as shown by the arrow 64, at a feed rate greater than that of the tool holder housing 22 because the tool holder 14 is not secured axially relative to the tool holder housing 22. Instead, the tool holder 14 is secured to the tool holder housing 22 through the drive pin 38, which is disposed through the elongate slots 42 in the tool holder 14. Because the elongate slots 42 are longer in the axial direction than the width of the drive pin 38, the tool holder 14 is allowed to extend and retract along the central axis relative to the tool holder housing 22, and lines parallel to the central axis. This movement is limited in the direction shown by the arrow 62 by the mating surfaces 54, 56, as shown in FIG. 2, and in the direction shown by the arrow 64 by the interaction of the drive pin 38 and the inwardmost surface 68 of the elongate slots 42, as shown in FIG. 3.

A spring 70 is disposed in the receptacle 72 of the tool holder 14 to act between the drive pin 38 and a surface at the end 16 of the tool holder 14. The spring 70 is provided to ensure that the tapping tool engages the threaded bore on the return stroke of the automated drilling head 8, and that upon complete withdrawal of the tool 10 from the tapped hole the tool 10 is automatically centered and readied for the next cycle.

Most preferably, the drilling and tapping operations can be performed without changing tools through the use of a tool commercially available from Cutting Tools, Inc. under the trademark DRAP, as shown attached to the embodiments of the present invention in FIGS. 1–5. The DRAP tool has an initial portion 74 preferably shaped as a two-fluted twist drill, and is used to remove material to form the bore. The subsequent, intermediate portion 74 is shaped as a tapping tool, preferably with up to four flutes and a plurality of cutting teeth, to immediately tap the drilled portion of the bore as the tool advances further into the workpiece. The remaining, distal portion 78 of the tool is formed as a straight shank to be disposed within the collet 48. By using a DRAP tool, instead of separate conventional drill bits and tapping tools, a threaded bore can be machined in a single operation with a single pass of an automated drilling head, drill press or machining center without the need to change tools, tool attachment assemblies, or machines.

At the initiation of a combined drilling and tapping operation, the tool holder 14 is situated in a first axial position relative to the housing 22, as shown in FIG. 2, wherein the tool holder surface 54 facially abuts to the housing surface 56. The tool 10 is rotated at a first speed and advanced axially toward a workpiece, i.e. right to left in FIG. 1, by the drilling head 8 at a first rate. As the drilling head 8 effects advancement, the coaction between the surfaces 52, 54 causes the central axis of the tool holder 14 and housing 22 to become and remain substantially coincident. Radial movement of the tool holder 14 relative to the housing is substantially prevented with the tool holder 14 in the first position.

Once the drill portion 70 penetrates the workpiece to a predetermined depth, the tapping portion 72 engages the workpiece. As the tapping portion 72 engages the workpiece the tool 10 is caused to advance at a second rate that is greater than the rate of advancement of the tool holder by the drilling head 8. As a result, the tool holder 14 moves into a second axial position relative to the housing 22, as shown in FIG. 3, wherein the tool holder surface 54 separates from the housing surface 56. In the second position the tool holder 14 can float radially relative to the housing 22 to move into the bore even if there is a slight misalignment therewith.

Once the tool 10 is extracted from the workpiece, the tool holder 14 is driven by the spring 70 back to its first position in preparation for the next cycle.

While FIGS. 1–3 show a preferred embodiment of the present invention configured to be used with an automated drilling head, the present invention is not limited to such an application. FIG. 4 shows an alternative embodiment of the invention configured to be used with ASA-type straight-shank machine tools. FIG. 5 shows an alternative embodiment of the invention configured with a V-flange tapered shank for use with machining centers with automatic tool changers.

Still other aspects, objects, and advantages of the present invention can be obtained from a study of the specification, the drawings, and the appended claims.

We claim:

1. A tool attachment assembly comprising:

a housing having a central axis;

a tool holder having a tool carrying portion and a mounting portion spaced axially from the tool carrying portion;

a projection on one of the housing and the mounting portion of the tool holder;

a receptacle on the other of the housing and the mounting portion of the tool holder for receiving the projection so that the housing and the tool holder reside at least partially, one within the other, and are movable relative to each other in an axial direction with the tool holder in an operative state on the housing, there being axially facing first and second surfaces, one each on the housing and the mounting portion of the tool holder, that each extend at least partially around the central axis and are abuttable to each other to limit movement of the tool holder axially towards the housing with the tool holder in the operative state, at least one of the first and second surfaces being other than parallel to a plane that is orthogonal to the central axis; and a biasing element for urging one of the housing and tool holder axially relative to the other of the housing and tool holder to thereby urge the first and second surfaces towards each other.

2. The tool attachment assembly according to claim 1, wherein the first surface comprises a substantially planar surface, as viewed in cross section.

3. The tool attachment assembly according to claim 1, wherein the first and second surfaces comprise substantially planar surfaces as viewed in cross section.

4. The tool attachment assembly according to claim 3, wherein the first surface is at a first angle to the central axis, and the second surface is at a second angle to the central axis, the second angle being approximately equal to the first angle.

5. The tool attachment assembly according to claim 4, wherein the first and second surfaces extend substantially fully around the central axis.

6. The tool attachment assembly according to claim 1, wherein the first and second surfaces are abuttable to each other to limit radial movement of the tool holder relative to the housing with the tool holder in the operative state.

7. The tool attachment assembly according to claim 1, further comprising means cooperating between the tool holder and housing for limiting axial movement of the tool holder away from the housing.

8. A tool attachment assembly comprising:

a housing having a central axis;

a tool holder having a tool carrying portion and a mounting portion spaced axially from the tool carrying portion;

a projection on one of the housing and the mounting portion of the tool holder; and a receptacle on the other of the housing and the mounting portion of the tool holder for receiving the projection so that the housing and the tool holder reside at least partially, one within the other, with the tool holder in an operative state on the housing, there being axially facing first and second surfaces, one each on the housing and the mounting portion of the tool holder, that each extend at least partially around the central axis and are abuttable to each other to limit movement of the tool holder axially towards the housing with the tool holder in the operative state, at least one of the first and second surfaces being other than parallel to a plane that is orthogonal to the central axis, wherein the projection and the receptacle are relatively dimensioned so that the tool holder and housing are movable in a radial direction relative to each other with the tool holder in the operative state.

9. The tool attachment assembly according to claim 8 wherein the projection has an annular outer surface and the receptacle has an annular inner surface and with the projection centered in the receptacle there is a space between the outer projection surface and inner receptacle surface.

10. The tool attachment assembly according to claim 9, wherein the space is between 0.00027 and 0.0016 inches.

11. A tool attachment assembly comprising:

a housing having a central axis;

a tool holder having a tool carrying portion and a mounting portion spaced axially from the tool carrying portion;

a projection on one of the housing and the mounting portion of the tool holder;

a receptacle on the other of the housing and the mounting portion of the tool holder for receiving the projection so that the housing and the tool holder reside at least partially, one within the other, with the tool holder in an operative state on the housing, there being axially facing first and second surfaces, one each on the housing and the mounting portion of the tool holder, that each extend at least partially around the central axis and are abuttable to each other to limit movement of the tool holder axially towards the housing with the tool holder in the operative state; and means cooperating between the tool holder and housing for limiting axial movement of the tool holder away from the housing, wherein the limiting means comprises a pin on one of the tool holder and housing and an elongate slot on the other of the tool holder and housing for receiving the pin, said elongate slot being bounded by a surface that abuts to the pin.

12. The tool attachment assembly according to claim 11 including a spring element acting between the housing and tool holder for normally urging the tool holder axially towards the housing.

13. The tool attachment assembly according to claim 12 wherein the spring element abuts to the pin.

14. The tool attachment assembly according to claim 13 wherein the tool holder has a second receptacle bounded by an axially facing surface and the spring resides at least partially in the second receptacle and is compressed between the pin and the axially facing surface bounding the second receptacle.

15. In combination:

(a) a tool attachment assembly comprising:

a housing having a central axis;

a tool holder having a tool carrying portion and a mounting portion spaced axially from the tool carrying portion;

a projection on one of the housing and the mounting portion of the tool holder; and a receptacle on the other of the housing and the mounting portion of the tool holder for receiving the projection so that the housing and the tool holder reside at least partially, one within the other, with the tool holder in an operative state on the housing, there being axially facing first and second surfaces, one each on the housing and the mounting portion of the tool holder, that each extend at least partially around the central axis and are abuttable to each other to limit movement of the tool holder axially towards the housing with the tool holder in the operative state; and b) a tool having a rotational axis, a first drill portion and a second tapping portion spaced axially relative to the first drill portion, there being means cooperating between the tool holder and tool for maintaining the tool in an operative position on the tool holder, said tool holder being in i) a first axial position relative to the housing with the first and second surfaces abutted to each other and ii) a second axial position relative to the housing with the tool holder moved axially away from the housing so that the first and second surfaces do not abut to each other, said housing and tool holder being relatively dimensioned to allow the tool holder to move radially relative to the housing with the tool holder in the second position.

16. The tool attachment assembly according to claim 15 wherein the first and second surfaces are shaped to cause the tool holder to consistently align radially relative to each other as the tool holder is moved from the second position into the first position.

17. The tool attachment assembly according to claim 16 wherein the tool holder has a central axis and the first and second surfaces are shaped to cause the tool holder to consistently align with the central axes of the tool holder and housing substantially coincident.

18. The tool attachment assembly according to claim 15 wherein the first and second surfaces are shaped to cause the tool holder to be substantially fixed radially relative to the housing as the tool holder is moved from the second position into the first position.

19. The tool attachment assembly according to claim 18 wherein the first and second surfaces are substantially planar as viewed in cross section and each extend substantially fully around the central axis.

20. The tool attachment assembly according to claim 19 wherein the projection has an annular outer surface and the receptacle has an annular inner surface and with the tool holder in the second position the tool holder can float radially relative to the housing.

21. In combination:

a) a tool attachment assembly comprising:

a housing having a central axis;

a tool holder having a central axis; and means cooperating between the housing and tool holder for maintaining the tool holder in an operative state on the housing and for guiding movement of the tool holder axially relative to the housing between i) a first position, wherein relative radial movement between the housing and tool holder is substantially prevented and ii) a second position wherein the tool holder can float radially relative to the housing; and b) a rotary tool having a drill portion and a tapping portion, whereupon with the drill portion of the rotary tool penetrating a workpiece with the tool holder in the first position, the tool holder and housing have a substantially fixed relative position and upon the tapping section entering a workpiece with the tool holder in the second position the tool holder is moved axially relative to the housing away from the first position so that the tool can float radially relative to the housing.

22. A method of forming a threaded bore, said method comprising the steps of:

providing a tool attachment assembly comprising a housing having a central axis; a rotary tool having a drill portion and a tapping portion; and means cooperating between the housing and tool holder for maintaining the tool holder in an operative state on the housing and for guiding relative movement of the tool holder axially relative to the housing between a) a first position wherein relative radial movement between the housing and tool holder is substantially prevented and b) a second position wherein the tool holder can float radially relative to the housing; and rotating the tool holder at a first speed while advancing the housing in a first direction at a first rate to cause the drill portion to advance in the first direction at the first rate to produce a bore in the workpiece;

forming threads within the bore by advancing the tapping portion into the workpiece bore with the tool holder rotating at the first speed and advancing in the first direction at the first rate so that the tapping portion engages the workpiece and as a result advances in the first direction at a rate greater than the first rate, thereby moving the tool holder into the second position; and withdrawing the rotary tool from the workpiece.

* * * * *